Sept. 6, 1949.　　　　G. A. BOLE ET AL　　　　2,481,069
CERAMIC SPACE HEATER

Filed May 30, 1944　　　　　　　　　　7 Sheets-Sheet 1

Inventors
George A. Bole,
LeWitt H. Wyatt,
By W. S. McDowell
Attorney

Sept. 6, 1949.  G. A. BOLE ET AL  2,481,069
CERAMIC SPACE HEATER
Filed May 30, 1944  7 Sheets-Sheet 3

Fig. 4.

Inventors
George A. Bole,
DeWitt H. Wyatt,
By W. A. McDowell
Attorney

Sept. 6, 1949.　　　G. A. BOLE ET AL　　　2,481,069
CERAMIC SPACE HEATER

Filed May 30, 1944　　　　　　　　　7 Sheets-Sheet 4

Inventors
George A. Bole,
DeWitt H. Wyatt,

By J. A. McDowell
Attorney

Sept. 6, 1949. G. A. BOLE ET AL 2,481,069
CERAMIC SPACE HEATER

Filed May 30, 1944 7 Sheets-Sheet 5

Inventors
George A. Bole,
DeWitt H. Wyatt,
By W. S. McDowell
Attorney

Sept. 6, 1949.   G. A. BOLE ET AL   2,481,069
CERAMIC SPACE HEATER

Filed May 30, 1944   7 Sheets-Sheet 7

Inventors
George A. Bole,
DeWitt H. Wyatt,

By  N. S. McDowell
Attorney

Patented Sept. 6, 1949

2,481,069

UNITED STATES PATENT OFFICE 2,481,069

CERAMIC SPACE HEATER

George A. Bole and DeWitt H. Wyatt, Columbus, Ohio, assignors to The Ohio State University Research Foundation, Columbus, Ohio, a corporation of Ohio Application May 30, 1944, Serial No. 538,035

8 Claims. (Cl. 126—68)

This invention relates to fuel-burning appliances, and has particular reference to room heaters, stoves and furnaces employed in the heating of residences and other buildings.

Usually, such appliances are formed primarily from metal for convenience in fabrication and since metal is a good heat-conducting material. However, metal stoves are highly sensitive to combustion taking place therein and quickly cool off, causing room areas heated thereby to readily vary in temperature. Ceramic materials, on the other hand, do not possess the same high rate of heat conductivity as metal, but when once heated, the same retain their heat to a materially greater extent than metal and, as a result, provide a more uniform heating temperature for longer periods of time than can be obtained with the use of metal. Furthermore, with the present relative scarcity of metals, we have found ceramic materials well suited for stove design, providing that adequate provision is made for the proper circulation or passage of air over heated surfaces.

It is, therefore, one of the principal objects of the present invention to provide an efficient, durable and low-cost heater, stove or furnace adapted particularly, though not necessarily so limited, for the combustion of solid fuels, and wherein the wall-forming members of the heater or stove casing are composed primarily of materials having a ceramic composition, using but minimum amounts of metal in the construction thereof.

It is another object of the invention to provide a fuel-burning heater having a ceramic casing and provided internally with a fuel-magazine of storage capacity, whereby fuel is fed gravitationally toward a grate or high temperature zone of combustion, passages being so formed in the walls of the casing as to provide adequate draft through the fuel-containing magazine, causing fuel gases or volatiles to be thoroughly burned and consumed, thereby increasing the efficiency to the stove or heater and eliminating, or substantially reducing, the formation of soot and smoke.

Another object of the invention is to provide a heater of the character indicated, wherein the ceramic casing thereof is formed with passages of novel design adapted for the extended passage of the hot flue gases generated by fuel combustion within the casing, so that the contact of said gases with the heat-liberating surfaces of the casing will be sufficiently prolonged to provide for efficient heat transfer and resulting low temperatures in the out-flowing chimney gases.

A further object is to provide the ceramic casing of such a fuel-burning stove or heater with additional passages, spaced from the flue gas passages, for the circulation of room air, whereby when the stove is utilized as a space heater, an efficient interchange of heat is obtainable. A license to this invention or any patent or patents which may be issued thereon, based upon disclosures in this application, is granted to the Government of the United States.

Other objects and advantages will be apparent from consideration of the following description and the accompanying drawings, wherein:

Fig. 13 is a detail vertical sectional view disclosing the butterfly valve operating means;

Referring more particularly to the drawings, the numeral 10 designates the base section of our improved heater. The same comprises a fired-clay body having a horizontal bottom wall 11, integral upwardly extending inner walls 12 and a vertical outer wall 13, the walls 12 and 13 being spaced as at 14. The upper portion of the inner walls 12 terminate below the upper edges of the outer walls 13 to provide horizontally disposed ledges 15, the latter being adapted to receive and support a sheet metal grate plate 16.

Figure 4:
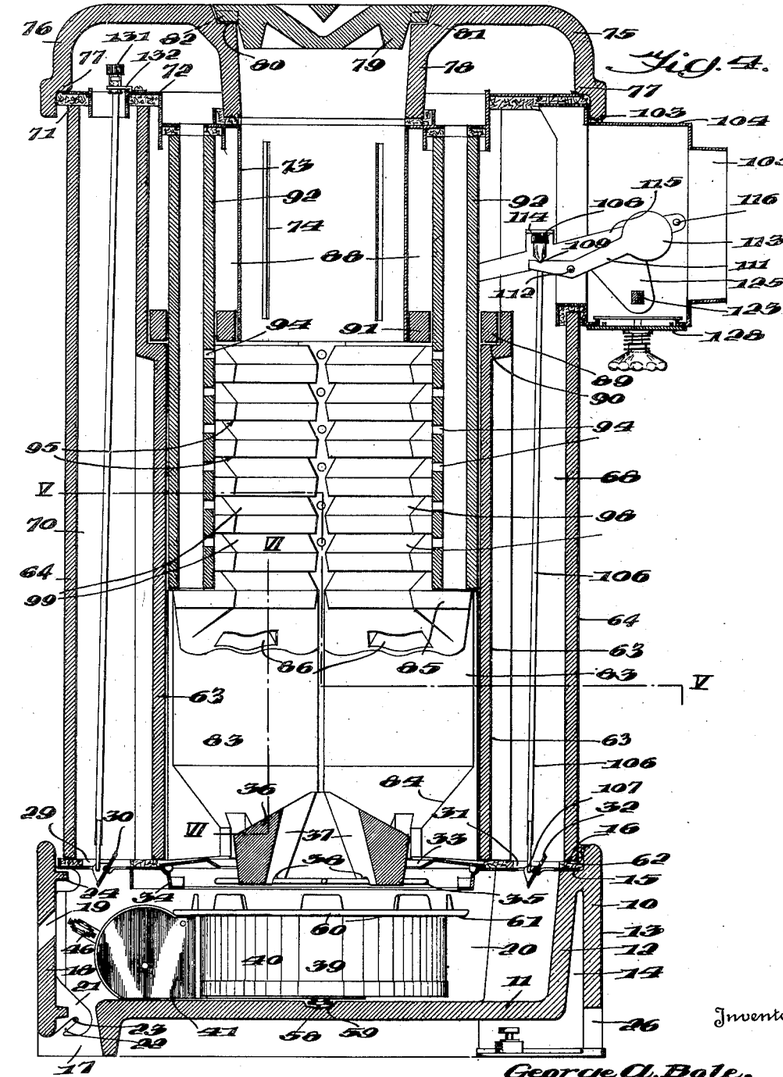
Fig. 4 is a vertical sectional view taken through the heater.

At its front, the base section is formed with an ash pit opening 17 which is adapted to be at least partially closed by a draft door 18. This door is also formed from ceramic materials and is provided with spaced ports 19 disposed and proportioned to provide for the inflow of room air into the ash pit 20 of the base section. The door 18 is supported in the opening 17 by being provided at its lower and inner sides with integral inwardly projecting ears 21 which are diagonally slotted as at 22 for the reception of stationary pivot pins 23, the latter projecting horizontally from the sides of the opening 17. The door may swing about the axis afforded by the pins 23, but also may be adjusted relatively thereto by the provision of the slots 22. The top of the door at its inner side is provided with a spaced pair of lugs 24, which carry latch pins 25. When the door is closed, as in Fig. 4, the ends of these pins engage with shoulders 25' on the grate plate 16 which maintain the door in a substantially vertical position.

Figure 1:
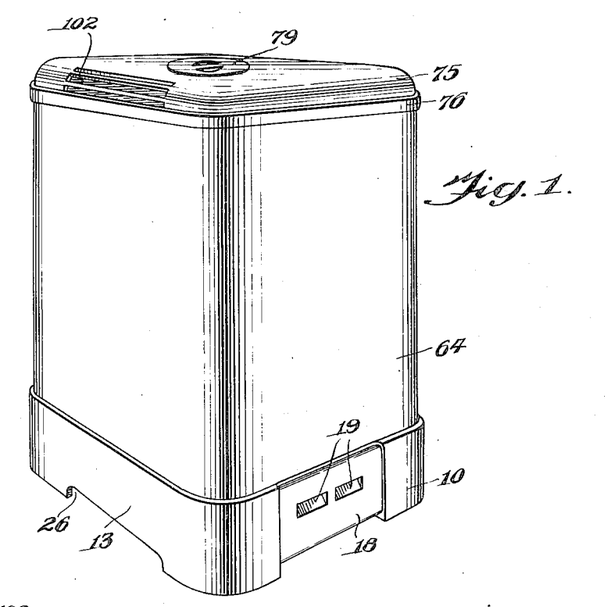
Fig. 1 is a perspective view of a ceramic heater formed in accordance with the present invention.
Figure 2:
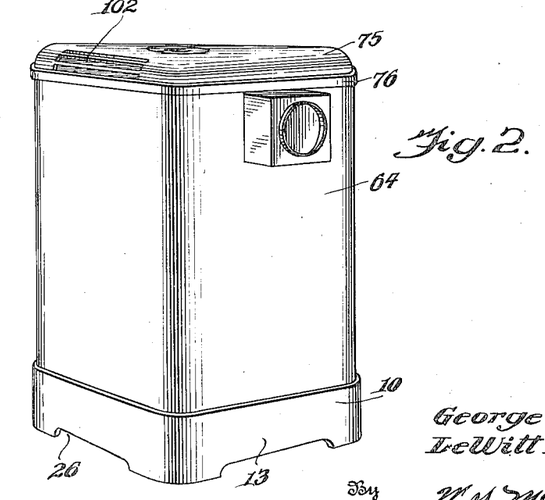
Fig. 2 is a similar view, on a somewhat reduced scale, looking toward the rear of the heater.
Figure 3:
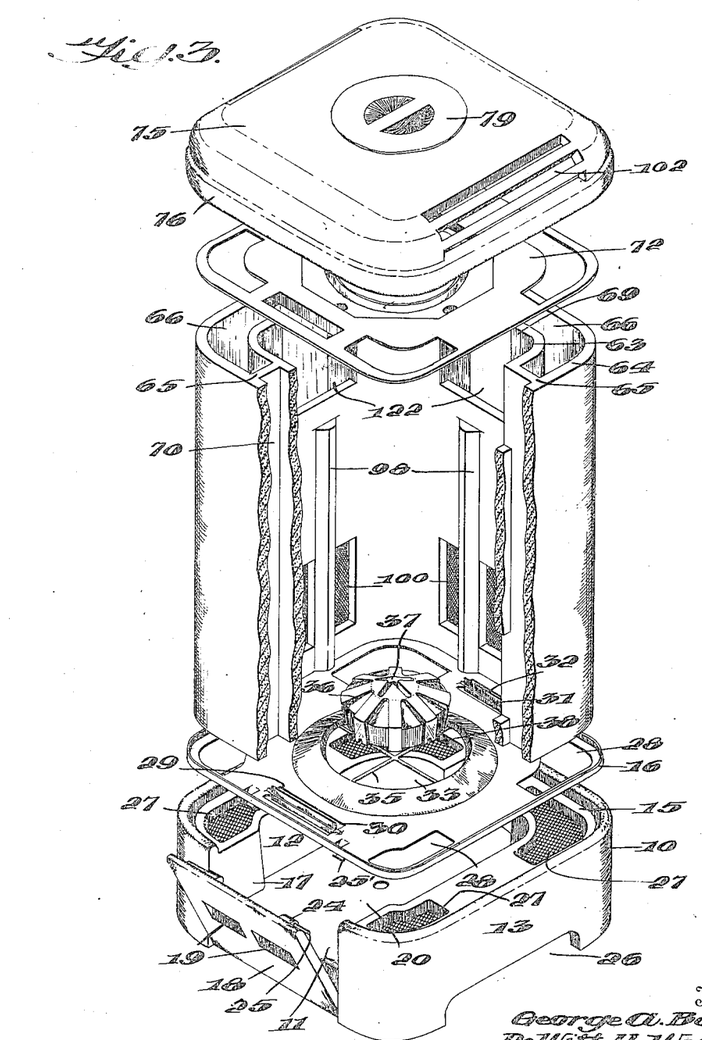
Fig. 3 is a perspective view, showing the various parts of the heater in a separated state, parts of the heater casing being broken away to disclose internal structure.

The outer walls 13 of the base section may, at the sides and back thereof, be provided with floor recesses 26 by which air, withdrawn from the floor on which the heater is positioned, is introduced into vertical passages 27 formed in the corners of said base section between the inner and outer walls 12 and 13. The grate plate 16 has its corners apertured as at 28 for registration with the upper ends of the passages 27, as shown in Fig. 3. Also, the front of the grate plate has formed therein a rectangular slot 29 in which is positioned a pivotally movable butterfly valve 30, which is employed in controlling the flow of air into upper portions of the heater casing. Likewise, at its rear, the grate plate is provided with a rectangular opening 31 in which is located a pivoted airflow-controlling valve 32, the operation of which will be hereinafter described.

Centrally, the plate 16 is formed with a grate-receiving opening 33 and below this opening, with a depending flange 34. Supported on this flange is a metallic spider 35 upon which is positioned a perforate, circular ceramic grate 36. The grate is formed from a molded body of ceramic composition and is provided centrally with communicating radially disposed passages 37 which extend through the grate from top to bottom thereof, said passages providing for the flow of air centrally through the grate in an upward direction in contact with the extended surface area of the grate body. The air so supplied is used for the dual purpose of contributing to the active combustion of fuel burned over the grate and also to cool and maintain the grate at operating temperatures of such order that the composition of the grate will not be deleteriously affected by the temperatures to which it is subjected during operation of the heater.

The bottom of the grate is formed with grooves 38 which receive the supporting spider 35. Preferably the top of the grate is of conical formation to provide for the gravitational passage of burning fuels thereover in an outward, peripheral direction. The diameter of the grate is such that it is spaced from the edge walls of the opening 33, in order that the fine ash, produced through the operation of the heater, may gravitate downwardly into the pit 20, where, in the preferred form of our invention, a removable ash receiver 39 is located.

The ash receiver comprises a circular outer casing 40, which is formed peripherally with a lever housing 41, the interior of the casing being formed to provide an ash-receiving well 42. Pivotally mounted, as at 43, within the housing 41 is an operating lever 44, the latter extending through an arcuate slot 45 formed in the housing and terminating at its outer end in a manipulating extension 46. A spring 47 has one end fixed within the housing 41 and the other end receivable in a recess 48 formed in one edge of the widened inner end of the lever. Also, pivotally connected as at 49 with the inner end of the lever is one end of a link 50, the opposite end of said link being pivoted as at 51 to a stationary support 52 which is disposed longitudinally in the open bottom of the housing and which normally rests on the upper surface of the bottom wall 11 of the base section 10. United with the pivot 49 of the lever is a bar 53, the forward end of this bar being pivoted as at 54 to a pair of diverging links 55. The lower of these links are pivoted, as at 56, to the support 52 while the upper of the links 55 are pivoted, as at 57, to the housing 41. In the axial center of the casing 40, the support 52 is equipped with a depending disk 58 which is received in a centering and stop socket 59 provided in the wall 11 of the base section. The upper perimeter of the casing 40 includes a plurality of spaced upstanding lugs 60 which receive between them the radiating wires constituting the spider 35 when the casing 40 is elevated. Such elevation is accomplished by depressing the outer end of the lever 44 which results in longitudinally moving the bar 53 in a horizontal plane toward the center of the casing, causing elevation of the links 50 and 55 and thereby bodily raising the casing 40 until its peripheral flange 61 engages with the flange 34 on which the spider 35 is rotatably positioned.

This engagement shuts off the flow of primary air passing through the grate opening to the bottom of the grate 36 and mechanically unites the ash receiver with the grate. By grasping the housing extension 41 of the casing, the grate may then be oscillated about its vertical axis, causing the fine ash to pass through the opening 33 and into the well 42 of the ash receiver. When filled with ash, the receiver may be bodily removed from the ash pit 20 and its contents suitably discharged.

Figure 5:
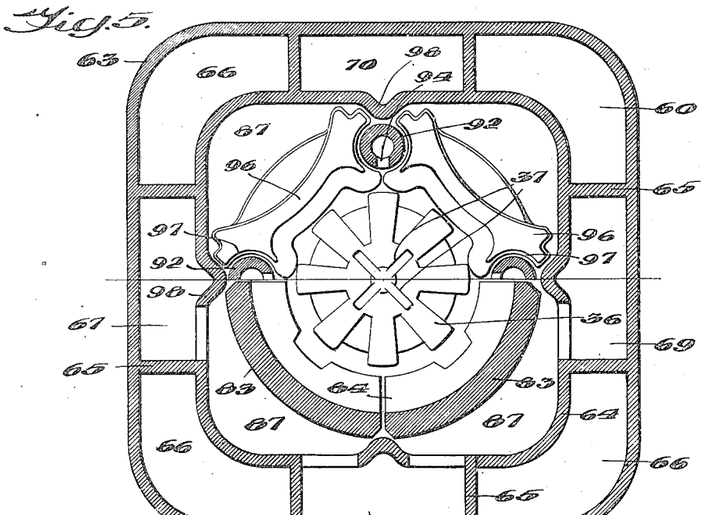
Fig. 5 is a horizontal sectional view taken on the plane indicated by the line V—V of Fig. 4.
Figure 6:
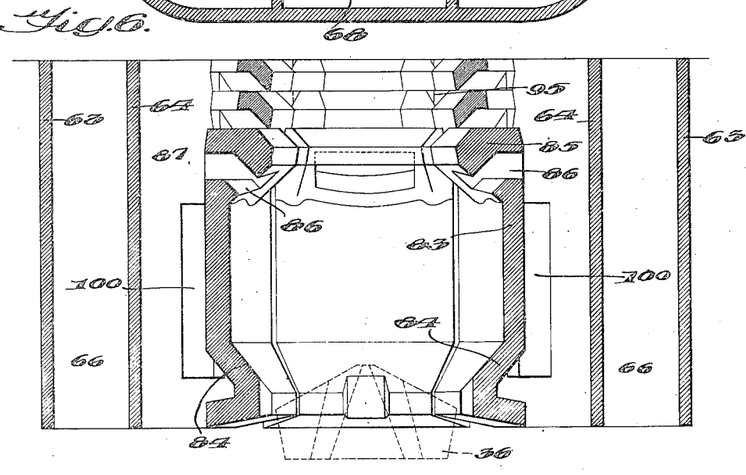
Fig. 6 is a fragmentary vertical sectional view on the plane indicated by the line VI—VI of Fig. 4.
Figures 7, 8, 9, 10:
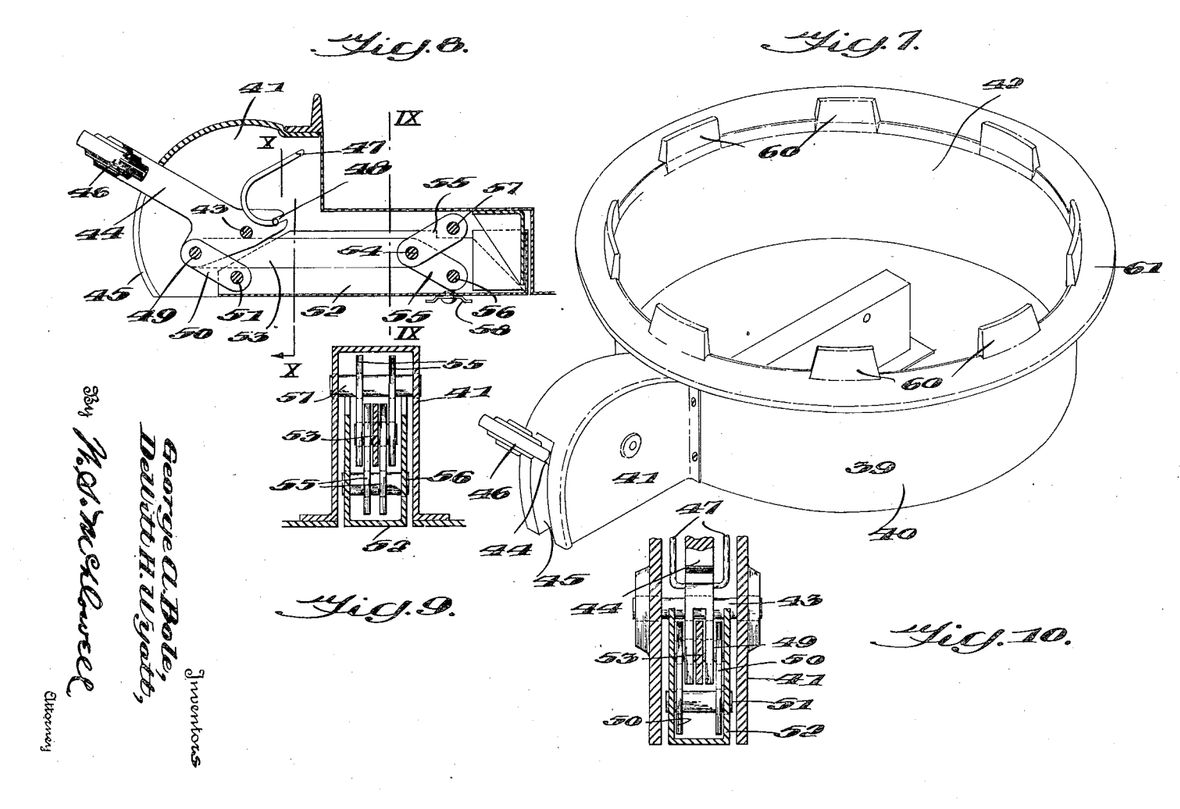
Fig. 7 is a perspective view of the removable ash receiver.
Fig. 8 is a detail vertical sectional view taken through the ash receiver.
Fig. 9 is a transverse sectional view on the line IX—IX of Fig. 8.
Fig. 10 is a similar view on the plane indicated by the line X—X of Fig. 8.
Figures 10, 11, 12:
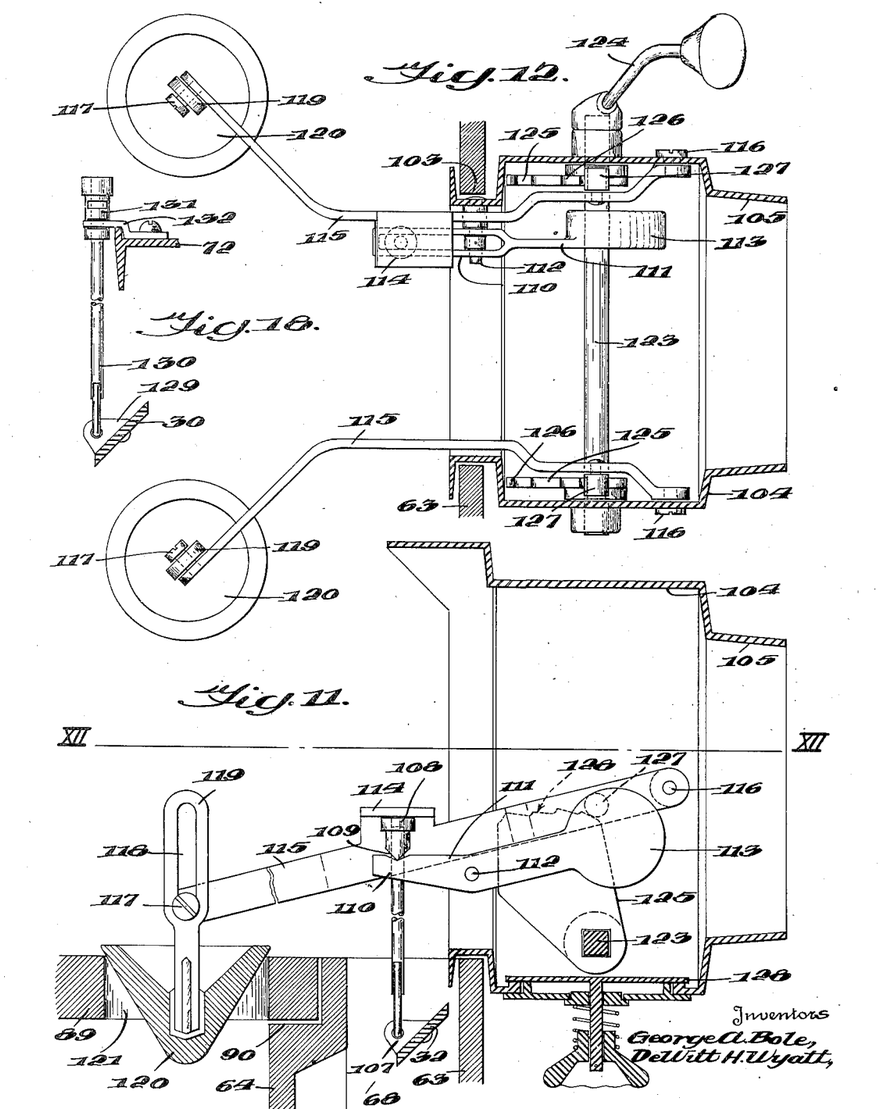
Fig. 11 is a detail vertical sectional view disclosing the damper and by-pass valve operating mechanisms.
Fig. 12 is a sectional view on the line XII—XII of Fig. 11.
Figure 14:
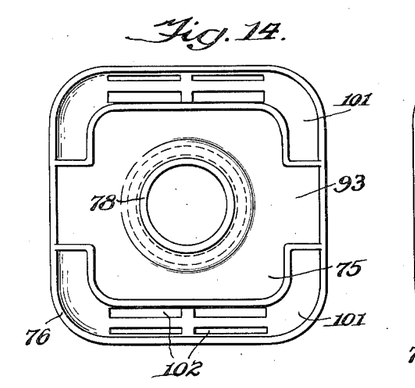
Fig. 14 is a bottom plan view of the removable cover section of the heater.
Figure 15:
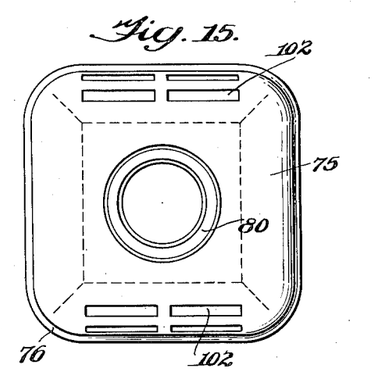
Fig. 15 is a top plan view thereof.
Figure 16:
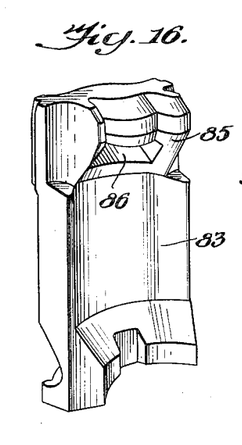
Fig. 16 is a perspective view of one of the bowl-forming refractories.
Figure 17:
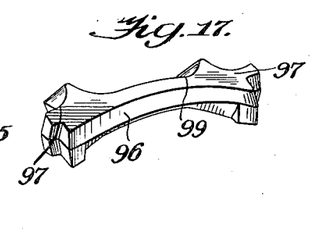
Fig. 17 is a similar view of one of the grid elements.

Resting on a mineral fiber gasket 62 arranged on the upper surface of the grate plate 16 are the lower edges of the intermediate section of the heater casing. As shown in Fig. 5, the intermediate section comprises a ceramic body substantially rectangular in its horizontal cross section, the same having spaced inner and outer vertically extending walls 63 and 64, respectively, these walls being united at intervals by transversely extending webs 65. The cross-sectional configuration of this intermediate section is such as to permit of its extrusion through suitable dies, although it may be formed in any other convenient manner, as by individually molding the same. At its four corners, the intermediate section is provided between the walls 63, 64 and 65 with vertical passages 66 which register at their lower ends with the passages 27 provided in the base section 10 and through which air drawn from the floor beneath the heater passes upwardly and is heated, principally by convection, for discharge into the room atmosphere.

Between the passages 66, the intermediate casing section is formed to provide vertical flue gas passages, indicated at 67, 68 and 69. Said intermediate section also includes another vertically extending air passage 70 between convection passages 66 and disposed in registration with the front of the intermediate section. The passage 70 has its lower end disposed over and in registration with the slot 29 and butterfly valve 30 of the grate plate 16, so that when the valve 30 is open, air, entering the front part of the ash pit 20, will be diverted in part and caused to traverse the passage 70 in an upward direction, for a purpose to be hereinafter explained.

Positioned on the upper edges of the intermediate casing section is a mineral fiber or other gasket 71, and mounted on the upper surface of this gasket is a metallic top plate 72. Centrally, the plate 72 is provided with a magazine opening from the margins of which depend a metallic cylinder 73 which is slotted vertically as at 74 to provide gas outlets. Seated on the upper surfaces of the plate 72 is the top section 75 of the heater casing, said top section being of ceramic composition and formed with an outer flange 76 which is shouldered as at 77 to engage the plate 72 and the gasket 71. Centrally, the top section includes a depending fuel-receiving throat 78, the latter being disposed in registration with the upper end of the cylinder 73 to form the upper part of a fuel magazine. The upper end of the throat is closed by a removable ceramic lid 79. This lid seats in a recess 80 provided in the upper end of the throat 78, the recess being formed at intervals with upstanding lugs 81 which are receivable in grooves 82 provided in the under part of the lid, so that when the lugs are disposed in the grooves 82, the lid will be fully seated within the recess 80. However, when the lid is rotated so that the grooves do not register with the lugs, the same will be slightly elevated to admit air into the upper part of the fuel-containing magazine.

Mounted on the grate plate structure 16 and surrounding the grate 36 is a plurality of circularly disposed segmental refractories 83. As the coal gravitationally descends in the fuel magazine, the temperature thereof increases, gases and volatiles being released from the coal as the temperature thereof progressively increases and by the time the fuel reaches the lower part of the combustion bowl, provided by the refractories 83, it is usually in the form of burning coke. The lower portion of the refractories 83 provide inwardly sloping surfaces 84 which direct the fuel toward the upper conical end of the grate 36. In addition to being slightly spaced relative to each other to form slots or grooves therebeteween, the refractories are provided, contiguous to their upper ends, with widened inwardly-directed ledges 85 in which are formed gas outlets 86. The high temperature gases issuing from the outlets 86 impinge the inner surfaces of the casing walls 64 and sweep upwardly through the space or spaces 87 formed within the casing and which communicate with a flue gas chamber 88 provided in the upper portion of the intermediate section of the casing. The flue gas space 87 and the chamber 88 are separated by a ceramic baffle plate 89 which is positioned on shoulders 90 provided on the walls 64.

The baffle plate 89 is formed with openings 91 through which extend a plurality of secondary air-conducting tubes 92. These tubes are vertically arranged with their lower ends resting on the ledges 85 of the refractories 83 and the upper open ends of said tubes register with corresponding openings provided in the top plate structure 72, in order that by means of chambers 93, provided in the under part of the lid 79, the said tubes will receive downwardly moving air which has been introduced into the casing through the passage 70. In the length thereof, below the cylinder 73, the tubes are provided with inwardly directed, vertically spaced ports 94 by which secondary air may enter the vertically disposed column of fuel in the magazine as the fuel approaches the coke-forming zone. The introduction of this secondary air serves to provide for active combustion of gases or volatiles released from the fuel during distillation thereof, and these burning gases or volatiles are withdrawn from the magazine by passing through the interstices 95 formed between a plurality of ceramic grid elements 96. These grid elements, in their preferred form, are each of generally arcuate configuration and are disposed in superposed order in vertical rows. The ends of each of the elements are arcuately formed, as at 97, to engage with the outer rounded surfaces of the tubes 92. Also, the inner walls 64 are provided with vertically disposed ribs 98 which engage with the ends of the elements 96 and maintain the latter in their proper relative order. Also, the grid elements are formed with beveled adjacent surfaces 99 which produce the slots or interstices 95 between the same and through which the released fuel gases may travel when passing from the magazine proper into the space or spaces 87.

The vertical flue gas passages 67, 68 and 69, formed in the intermediate section of the casing, are provided contiguous to their lower portions with openings 100 by which a portion of the flue gases delivered to the space or spaces 87 are transferred to and pass upwardly through said last-named passages and are received in the chamber 88. The heat of these gases is transferred in large part to the walls 63, 64 and 65, heating the air traveling through the passages 66. The upper ends of the passages 66 communicate with chambers 101, provided in the under part of the lid 75, and issue into the room by way of the louvered outlets 102, integrally formed with the lid. Communicating with the chamber 88, and positioned in an opening 103 provided in the rear of the walls 63 is a furnace gas outlet housing 104. This housing is provided with an extension 105 which is adapted for connection with a chimney or other gas outlet stack, not shown.

To control the operation of the damper valve 32, provided in the bottom of the check draft passageway 68, use is made of a vertically extending rod 106 which, at its lower end, is engaged with an eccentric ear 107 provided on the valve, so that as the rod 106 is raised or lowered, the valve 32 may be turned about its pivotal mounting to open or close the opening 31 in the grate plate structure 16. The rod 106 is located vertically in the length of the passageway 68, and at its upper end has threaded engagement with an adjustable bearing sleeve 108. Said sleeve is formed with V-shaped lower surfaces 109 which have edge bearing on the bifurcated arms 110 of a counterbalancing lever 111. This lever is pivoted as at 112 in connection with the walls of the housing 104, and, at one end, the lever is weighted, as at 113, to offset the weight of associated structure influenced thereby, the tendency of the weighted end of the lever being to elevate the rod 106 to close the damper valve 32.

The upper end of the sleeve 108 is maintained by the lever 111 in engagement with a horizontally disposed lug 114 formed on one of a pair of arms 115. These arms are pivoted as at 116 to the housing 104 and project into the chamber 88. At their inner ends, the arms are provided with pins 117 receivable in slots 118 formed in the upper ends of links 119. The lower ends of the links are connected with ceramic bypass valves 120. These valves are normally positioned by bypass openings 121 provided in the baffle plate 89, so that gas flow communication between the upper regions of the space or spaces 87 and the chamber 88 is precluded, thereby causing the gaseous products of fuel combustion to traverse the passageways 67, 68 and 69 before gaining access to the chamber 88. The upper ends of the latter passageways communicate with the chamber 88 by means of openings 122 provided in the upper portions of the walls 64. However, when it is desired to provide a quick and open draft through the heater, the valves 120 are raised. This permits the flue gases to flow directly from the upper regions of the spaces 87 into the chamber 88 and thence to the outlet stack or chimney.

The opening and closing of the valves 120 is accomplished by the provision of a shaft 123, which is journaled in the housing 104 and projects beyond the same at one end for the reception of a manually operated control lever 124. Fixed to the shaft 123 for oscillation in unison therewith is a pair of spaced cam plates 125, these plates having eccentrically serrated upper edges 126. Engaged with these edges are rollers 127 which are carried by the arms 115.

It will be seen that by rocking the shaft 123, corresponding motion will be imparted to the plates 125, bringing different portions of the serrated edges 126 thereof into receiving engagement with the rollers 127, thereby raising or lowering the arms 115. The length of the slots 118 and the links 119 is such that the arms 115 may be raised to an extent permitting of complete closure of the damper valve 32 before the by-pass valves 120 will be raised to their positions of opening closure. Further elevating movement of said arms results in lifting the valves 120 to admit of gas passage directly from the upper regions of the spaces 87 into the chamber 88.

Exteriorly of the heater casing, the housing 104 is provided at its bottom with a removable plate 128 which provides access to the interiorly positioned draft-controlling apparatus. The butterfly valve 30 in the lower part of the passage 70 is formed with an offset ear 129 to which is connected the lower end of a control rod 130. This rod is positioned in the passage 70 and has its threaded upper end connected with an internally threaded nut 131. This nut cooperates with a stationary clip 132 carried by the plate structure 72. The clip has a bifurcated outer end with which grooves 133 provided in the outer surfaces of the nut 131 may be selectively engaged, thereby maintaining the valve 30 in various positions of adjustment.

It will thus be seen that the present invention provides an improved heater for the burning of solid fuels, said heater being formed primarily from parts of ceramic composition, metal parts being used to but a limited extent in comparison with the total weight of the heater. The ceramic parts have been designed so that they may be produced with standard clay molding or extrusion machinery, permitting these clay parts to be produced at various points of manufacture and transported to different places of assembly where the final heaters may be completed, thus saving shipping costs and simplifying manufacture. The magazine of the heater is formed so that it possesses fuel storage capacity, thus enabling the heater to operate for prolonged periods of time without fuel replenishment. As the fuel descends toward the active zone of combustion, its temperature is progressively increased to liberate therefrom gases and volatiles which are efficiently consumed, so that little or no smoke is produced, particularly after combustion has been properly initiated. In initial combustion stages, the by-pass valves 120 are open so that any smoke which is generated at this period passes readily into the stack outlet or chimney without gaining access to the atmosphere of a room in which the heater is positioned.

After desired combustion has been initiated, the by-pass valves are closed by the actuation of the lever 124, leaving the damper valve 32 in its closed position. This enables the major part of the primary air entering the heater through the ash pit 20 to pass directly through the grate structure 36 into the burning fuel. If the rate of combustion or heat generation becomes greater than that desired, the damper valve 32 is opened, driving a portion of the primary air from the ash pit into the passageway 68, thereby reducing the rate of fuel combustion in the region of the grate. Usually, the butterfly valve is adjusted in accordance with the fixed draft conditions provided by the particular chimney or outlet stack with which the heater is associated. For this reason, it is not necessary to locate the nut 131, which adjusts the operating positions of the valve 30, in an exteriorly accessible position. Air admitted into the passage 70 flows into the upper ends of the tubes 92 and issues from said tubes through the ports 94 provided therein. The air so admitted is termed, for present purposes, "secondary," and is used to combine with the volatiles released from the coal in the magazine to promote combustion thereof, such initially burning products passing through the interstices 95 provided between the grid elements 96 and being finally burned in the space or spaces 87. The slots 74 in the cylinder 73 also provide vents for smoke and other volatiles which may be present in the upper portions of the magazine.

The formation of the space or spaces 87 and their communicating passages 67, 68 and 69 provide extended paths for the passage of the hot flue gases generated by fuel combustion within the casing, so that the heat of such gases is in the main absorbed by the ceramic walls of the intermediate section and transmitted thereby to the convection or room air traveling upwardly through the passages 66. This heat exchange is of such nature that in the operation of the heater, its exterior walls 63 do not attain an unduly high temperature and will not produce injury upon being touched by the hands. The heater is designed so that it will burn virtually all types of commercial solid fuels, such as bituminous or anthracite coal, coke or the like, as well as most sizes of such fuels. In the region of the grate 36, the fuel is burned to the form of a fine ash, and does not tend to clinker. The ash readily passes through the space 33 and may be collected in the improved ash receiver 39.

The construction of the receiver is such that it may be used as a control for oscillating the grate during the removal of ash and because of its close association with the grate during this period of ash removal, there is little or no deposition of ash in the pit 20 nor on the floor surface adjacent the opening 17. This feature adds to the cleanliness of the heater when it is used for residence heating purposes. If there should be any bridging of the coal across the magazine or other undue fusion thereof above the grate structure, the removal of the lid 79 permits of the insertion of a poker or the like into the magazine to break up such fuel bridging or fusion.

The parts of the heater are of sturdy and rugged construction, fully capable of withstanding without injury, for sustained periods of use, the temperatures present within the heater. In the event of mechanical failure, however, defective parts may be readily replaced at low costs.

While the intermediate section of the casing has been shown as comprising an integral unitary structure, nevertheless, if desired, the same may be composed of two or more parts. It will be understood that the composition of the ceramic parts used in the construction of our improved heater is such that it will highly resist cracking, spalling or other forms of deterioration attributable to high temperatures, or to the temperature gradient set up in the outer casing. Also, while we prefer to form the parts of the heater primarily from ceramic materials, nevertheless, it will be appreciated that the mechanical features of the heater, by which improved fuel combustion and heat exchange take place, lend themselves to the use of other materials, such as sheet or cast metal, and with respect to these features, we do not limit ourselves to the employment of ceramic materials alone. While the heater has been particularly designed for the burning of solid fuels, such as various grades of coal, it is within the scope of the invention to produce heat by the burning of gas or oil, in which case a ceramic rubble may be placed in the combustion space or fuel magazine, thus enabling the apparatus to function as a storage heater.

We claim:

1. A solid fuel burning heater, comprising a casing of ceramic composition, composed of a base section formed with an air-admitting ash pit, a separable intermediate section having an internal fuel magazine positioned on said base section, said intermediate section being formed to provide spaced inner and outer vertically extending parallel walls integrally united at intervals by transverse walls, said walls forming therebetween open-ended heat interchanging passages consisting of: first, a passage for the travel of air used in fuel combustion, second, a flue gas passage, third, a plurality of air-heating passages and, fourth, a check draft passage, said combustion air passage being in communication at its lower end with the atmosphere of said ash pit and at its upper end with said fuel magazine, said flue gas passage being provided adjacent to its lower end with a flue gas inlet and at its upper end with a flue gas outlet, said air-heating passages at their lower and upper ends being in communication with the atmosphere, and said draft passage at its lower end being in communication with the atmosphere of said ash pit and having a flue gas inlet adjacent its lower region and a flue gas outlet at its upper end, a separable top section seated on the upper portion of said intermediate section, fire bowl refractories providing a high temperature combustion zone stationarily disposed in the bottom of the fuel magazine provided centrally in the intermediate section, said refractories being spaced from the inner walls of the intermediate section to provide a flue gas space therebetween with which space the inlet openings in the lower portions of the flue gas and draft passages are in open communication, and a grate supported between said ash pit and said high temperature combustion zone.

2. A heater as defined in claim 1 and wherein the grate is of ceramic construction having air passageways formed therein for the transmission of primary combustion air from the atmosphere of the ash pit to the high temperature combustion zone.

3. A heater for burning solid fuels comprising a casing of ceramic composition, said casing embodying a base section formed with an air-admitting ash pit, a separable intermediate section having an internal fuel-receiving magazine positioned on said base section, said intermediate section providing spaced inner and outer vertically extending parallel walls integrally united at intervals by transverse walls, said walls forming therebetween open-ended heat exchanging passages, the latter embodying: first, a passage for the travel of air used in fuel combustion, second, a flue gas passage, third, a plurality of air-heating passages and, fourth, a check draft passage, said combustion air passage being in communication at its lower end with the atmosphere of said ash pit and at its upper end with said magazine, said flue gas passage being provided adjacent its lower end with a flue gas opening and at its upper end with a flue gas outlet, said air-heating passages at their lower ends being in communication with continuing and registering open-ended passages formed in said base section, and said draft passage at its lower end being in communication with the atmosphere of said ash pit and having an outlet at its upper end, and a separable top section seated on the upper portion of said intermediate section, said top section being provided with spaced internal chambers, one of said chambers communicating with said combustion air passage to direct air discharged therefrom to said magazine and the other of said chambers communicating and with the upper ends of said air-heating passages for delivery to the atmosphere through vents in the walls of the last-named chamber.

4. A fuel-burning heater as defined in claim 3 having a vertically disposed fuel-receiving magazine provided centrally in the intermediate and top sections, and a grate structure provided in the bottom of said magazine.

5. A solid fuel-burning heater, comprising a casing of ceramic composition embodying a base section formed with an air admitting ash pit, a separable intermediate section having an internal fuel magazine positioned on said base section, said intermediate section being formed to provide spaced inner and outer vertically extending parallel walls united at intervals by transverse walls, said walls forming therebetween for heat interchange, first, a passage for the travel of air used in fuel combustion, second, a flue gas passage, third, a plurality of air-heating passages and, fourth, a check draft passage, said combustion air passage being in communication at its lower end with the atmosphere of said ash pit, said flue gas passage being provided adjacent to its lower region with a flue gas inlet and in its upper region with a flue gas outlet, said air-heating passages at their lower ends being in communication with complemental open-ended passages formed in said base section, and said draft passage at its lower end being in communication with the atmosphere of said ash pit and having a flue gas inlet adjacent to its lower region and an outlet therefor at its upper end, a separable top section seated on the upper portion of said intermediate section, a top plate arranged between said intermediate and top sections, ported fire bowl refractories stationarily disposed in the bottom of a fuel magazine provided centrally in the intermediate and top sections, said refractories being spaced from the inner walls of the intermediate section to provide a flue gas space therebetween with which space the inlet openings in the lower portions of the flue gas and draft passages are in open communication, a horizontally disposed baffle member stationarily positioned in said intermediate section below the flue gas outlets in the upper regions of said flue gas and draft passages, said member being formed with valve openings and normally closing the upper regions of the flue gas space, there being a flue gas outlet chamber formed with an outlet passage provided in said intermediate section above said baffle and below said top plate, said chamber being in communication with the upper portions of the gas and draft passages by the outlets provided therein, said chamber further communicationg by said outlet passage with the atmosphere, a grate plate arranged horizontally between said base and intermediate sections, said grate plate being formed with openings establishing communication between the air heating passages provided in the base and intermediate sections and being further provided with openings establishing communication between the ash pit of said base section and said combustion air and draft passages, movable valves positioned in said last-named openings for controlling the flow of air from said ash pit into said combustion air and draft passages, by-pass valves normally closing the valve openings formed in said baffle member, said by-pass valves, when open, establishing a by-pass for the flue gas from the normally closed upper regions of said flue gas space directly into said flue gas chamber, a plurality of ported air-conducting tubes disposed at the sides of said fuel magazine and above said bowl refractories, said tubes at their upper ends being in communication with a chamber provided in said top section and openings in said top plate with which the upper end of said combustion air passage communicates, a plurality of grid elements positioned at the sides of said magazine in abutting relationship with said tubes, said elements forming between them a multiplicity of interstices providing for gas flow between said magazine and flue gas space, and a rotary ceramic grate element carried by said grate plate in the bottom of said fuel magazine, the upper portion of said grate element being surrounded by said bowl refractories.

6. A solid fuel-burning heater comprising: a casing of ceramic composition, the bottom of said casing being formed with an air-vented ash pit and centrally above said ash pit with a fuel-receiving magazine coextensive with the height of the casing, a ceramic grate provided with air passages supported by said casing between said ash pit and the bottom of said fuel magazine, fire bowl refractories positioned in the bottom of said fuel magazine surrounding said grate to form a high temperature fuel combustion zone, the walls of said casing embodying spaced vertically extending inner and outer members integrally united by transverse webs and forming a flue gas passage leading from said high temperature combustion zone to an atmosphere vented flue gas chamber disposed in the upper portion of said casing, said casing walls additionally providing a check draft passage, the latter communicating at its lower end with said ash pit and at its upper end with said flue gas chamber, and a manually controlled damper valve for governing air flow from said ash pit into said draft passage.

7. A heater for burning solid fuels comprising a casing having an internal vertically and centrally arranged fuel-receiving magazine, the bottom of said casing being formed below said magazine with an atmosphere-vented ash pit, a movable grate arranged between the ash pit and the lower part of the fuel magazine, a plurality of block refractories arranged in the bottom of said magazine around said grate to form a fire bowl providing for active combustion of fuel delivered thereto from the magazine, a plurality of relatively spaced grid-forming refractories positioned on the top of said block refractories, vertical air-supplying tubes arranged at the sides of said magazine above said block refractories, said tubes being formed with ports located immediately adjacent to grid-forming refractories, the outer walls of said casing being formed with a vertically extending open-ended passage, the lower end of said passage being in communication with said ash pit and the upper end thereof in communication with the upper ends of said air-supplying tubes, manually adjustable valve means for regulating the flow of air from said ash pit into said passage, and a flue-gas passage formed in the walls of said casing, said gas passage having an inlet in communication with a zone of active fuel combustion adjacent to said block refractories and an outlet in communication with the atmosphere.

8. A heater for burning solid fuels comprising, a casing formed internally with a vertically extending centrally disposed fuel-receiving magazine and an underlying ash pit, the latter being vented to the atmosphere, the walls in the upper portion of said casing being arranged to form a flue gas outlet chamber, a flue gas passage formed in the walls of said chamber leading from the bottom of said fuel magazine to said chamber, a check draft passage formed in the walls of said casing, the lower end of said draft passage being in communication with said ash pit and the upper end thereof with said chamber, and valve means for regulating volumetrically the flow of air through said draft passage and from said ash pit.

GEORGE A. BOLE.
DE WITT H. WYATT.

REFERENCES CITED

The following references are of record in the file of this patent:

UNITED STATES PATENTS

| Number | Name | Date |
|---|---|---|
| 119,719 | Rand | Oct. 10, 1871 |
| 285,397 | Dodge | Sept. 25, 1883 |
| 434,403 | Rube | Aug. 12, 1890 |
| 1,322,425 | Garey | Nov. 18, 1919 |
| 1,987,548 | Brooks | Jan. 8, 1935 |
| 2,367,094 | Blumstengel | Jan. 9, 1945 |

FOREIGN PATENTS

| Number | Country | Date |
|---|---|---|
| 2,133 | Sweden | Apr. 20, 1889 |
| 11,872 | Germany | Nov. 19, 1880 |
| 17,682 | Great Britain | 1898 |
| 89,334 | Germany | Dec. 17, 1896 |
| 128,472 | Great Britain | June 26, 1919 |
| 152,307 | Germany | June 10, 1904 |
| 196,632 | Great Britain | July 4, 1924 |
| 760,502 | France | July 1, 1934 |